UNITED STATES PATENT OFFICE 2,206,652

EXPLOSIVE

William B. Woodring, Alton, Ill., assignor to Western Cartridge Company, East Alton, Ill., a corporation of Delaware No Drawing. Application October 30, 1939,
Serial No. 301,955

9 Claims. (Cl. 52—4)

This invention relates to explosives and has as an object the provision of novel explosive compositions. It will be explained with particular reference to primer compositions.

Primer compositions are in general of such nature as to be brought to explosion by percussion, frictional shock, and/or the application of heat.

Ammunition primer compositions must meet a number of requirements to be entirely satisfactory for use, including principally an adequate but not unduly great sensitivity to explosion on percussion, the property of providing a suitable flame when set off to ignite the propellent powder charges uniformly so as to furnish constant ballistic results for given rounds, and sufficient stability to withstand storage for extended periods even under conditions of abnormally high temperatures and humidities.

Similarly, a satisfactory degree of stability and suitable sensitivity to explosion by means of a flame are essential in primer compositions for use in blasting initiators.

Explosive compositions of these types and the individual ingredients should withal be safe and convenient to handle during the manufacturing operations and for use in the field.

In view of the many requirements, it is not surprising that deficiencies exist in prior compositions of these types. It is therefore an object of this invention to provide novel explosive compositions displaying improved functioning characteristics as primers.

I have found that primer mixtures of excellent stability and meeting all essential requirements for commercial use may be prepared with the use of a metal salt of trinitrosophloroglucin as an ingredient. By means of such admixture, I have found it possible so to improve the sensitivity to explosion by the agency of flame and/or percussion of otherwise insufficiently sensitive compositions as to render them entirely suitable for commercial use.

Metal salts of trinitrosopholoroglucinol may conveniently be prepared by the nitrosation of phloroglucinol with a soluble metal nitrite. In cases where the metal nitrite is insoluble, a double decomposition reaction may be advantageously utilized in order to obtain the desired salt. The lead salt may, for example, be prepared by interacting a lead nitrate solution with the trinitrosophloroglucinate of an alkali metal such as sodium or potassium, the latter having previously been obtained by reacting phloroglucinol with an alkali nitrite under suitable conditions. The chemical reactions involved may be represented as follows:

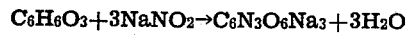

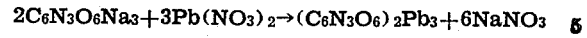

In the following examples, detailed procedures are set forth which illustrate methods of preparation of my novel ingredients for use in explosive compositions.

Example 1

Forty grams of phloroglucinol were stirred in 800 c. c. of water, 57.2 c. c. of glacial acetic acid and 100 c. c. of ethyl ether were added, and the mixture cooled to 7°–9° C. A solution of 67.6 grams of sodium nitrite in 400 c. c. of water was prepared, cooled to −2° C., and added dropwise to the above mixture during agitation. After continued agitation at a temperature of about 5° C. for 40–60 minutes, 110 grams of sodium hydroxide were added slowly so that the temperature did not rise above 14° C. The mixture was cooled to about 5° C. and filtered. The sodium salt separated as a green precipitate and was purified by mixing with 250 c. c. of water, heating to 60° C. with stirring, cooling to about 5° C. and filtering.

Example 2

A lead salt was prepared by adding the sodium salt as obtained in Example 1 to 1 liter of water, heating to 60° C. and slowly adding a solution of 160 grams of lead nitrate in 700 c. c. of water with stirring. After cooling and filtering or centrifuging, 126 grams of lead trinitrosophloroglucinate were obtained.

Example 3

Cadmium trinitrosophloroglucinate was prepared by stirring an aqueous suspension of the sodium salt at 70° C. and adding a solution containing the theoretical quantity of cadmium sulfate. The reaction mixture was cooled and the cadmium trinitrosophloroglucinate separated by filtration or centrifuging.

Example 4

The potassium salt was prepared by a procedure similar to that used in obtaining the sodium salt in accordance with Example 1, using an equivalent amount of potassium nitrite.

Insoluble metal salts of trinitrosophloroglucin may be prepared by double decomposition reactions similar to that described in Example 3, by interacting a soluble salt of the metal and sodium trinitrosophloroglucinate. Salts prepared in this way included those of copper, zinc, nickel, barium, and aluminum. In the case of the latter, it was found necessary to avoid the use of a substantial excess of the soluble aluminum salt since otherwise, the precipitate of aluminum trinitrosophloroglucinate was found to redissolve.

In the preparation of the metal salts, it was found that satisfactory results could be secured with the use of technical grades of phloroglucin as well as the chemically pure product. The metal salts referred to were all found to explode when subjected to percussion, as by means of a falling weight, or when heated, as by means of a flame or by being placed in contact with a heated metal bar or wire. Since the individual metal salts vary in their sensitivity to explosion by heat and shock, this series offers a range of compounds suitable for meeting the specific requirements of a variety of explosive compositions. The trinitrosophloroglucinates are particularly advantageous for use with compositions containing explosive aromatic nitro compounds, especially metal salts of aromatic nitro compounds containing an acidic group, such as nitro derivatives of phenolic compounds. For example, compositions containing lead styphnate are rendered more sensitive to percussion and function more reliably by the admixture of lead trinitrosophloroglucinate. The metal trinitrosophloroglucinates contain insufficient oxygen for complete combustion and are therefore utilized to best advantage when admixed with an active oxidizing agent.

Of the metal salts listed, the lead salt has displayed the most active explosive properties, being more sensitive to explosion by shock and heat than the other compounds. When prepared as above described, it is obtained having a lead content of about 56%, having a dark brown color when moist and grayish-brown when dry, of specific gravity 4.15 at 30° C., and exploding instantaneously when placed in contact with a metal bar heated to 210° C., a similar effect with normal lead styphnate requiring a temperature of 320° C. When moist with water, it is unaffected by the flame from a safety fuse, thus displaying the property, in common with the other metal trinitrosophloroglucinates, of being desensitized by water.

The procedure for obtaining the lead salt may be varied somewhat as to conditions of temperature, concentration, and rate of addition with corresponding slight changes in the product. It has been found that the lead content should preferably be within the range of 56 to somewhat above 60% for securing maximum explosive activity.

Metal salts of trinitrosophloroglucinol may be utilized in ammuntion primer compositions which admirably meet the sensitivity, ballistic functioning, and stability requirements for commercial use. Thus, in the case of lead styphnate compositions, which have been known in the art to be so deficient with respect to sensitivity to percussion as to lead to misfires, the admixture of a few percent of lead trinitrosophloroglucinate has been found to result in a composition having entirely adequate sensitivity characteristics.

Compositions listed in Table 1 have been found excellent in all respects for use in rim-fire ammunition, the specific compositions listed in the table being preferred for securing optimum results.

Table 1

|  | Range | Specific | Range | Specific |
|---|---|---|---|---|
| Normal lead styphnate | 35–55 | 45 | 35–55 | 41 |
| Lead trinitrosophloro-glucinate | 0.5–10 | 5 | 0.5–10 | 4 |
| Barium nitrate |  |  | 25–35 | 29 |
| Lead nitrate | 20–28 | 24 |  |  |
| Antimony sulfide |  |  | 1–10 | 5 |
| Glass | 20–28 | 25 | 15–25 | 20 |
| Gum |  | 1 |  | 1 |

Table 2 lists a number of other compositions which have been found suitable for use as ammunition primers.

Table 2

|  | 1 | 2 | 3 | 4 | 5 |
|---|---|---|---|---|---|
| Normal lead styphnate | 45 |  | 45 |  |  |
| Basic lead styphnate |  | 45 |  | 20 |  |
| Basic lead picrate |  |  |  | 25 |  |
| Diazodinitrophenol |  |  |  |  | 20 |
| Lead trinitrosophloroglucinate |  | 5 |  | 5 | 5 |
| Sodium trinitrosophloroglucinate | 5 |  |  |  |  |
| Cadmium trinitrosophloroglucinate |  |  | 5 |  |  |
| Antimony sulfide |  |  |  |  | 15 |
| Calcium silicide |  |  |  |  | 10 |
| Lead nitrate | 24 | 24 | 24 | 24 |  |
| Barium nitrate |  |  |  |  | 40 |
| Lead dioxide |  |  |  |  | 10 |
| Glass | 25 | 25 | 25 | 25 |  |
| Gum | 1 | 1 | 1 | 1 |  |

The sodium trinitrosophloroglucinate utilized in the above compositions consisted of a green powder, having a density of 1.62 at 30° C., and exploding instantaneously when placed in contact with a bar heated to 400° C. The cadmium salt was brown in color, had a density of 3.28 at 30° C., and an instantaneous flash point of 350° C.

It will be understood that primer compositions having suitable properties for various purposes may be prepared with the trinitrosophloroglucinates by the addition or substitution of other known oxidizers, fuels, and abrasives as well as other known explosives in the compositions shown in the foregoing table.

The trinitrosophloroglucinates of this invention are well suited because of their properties for use in primer mixtures in blasting caps. The lead salt when placed in contact with the bridge wire of an electric blasting cap was found to explode on passage of a current of 0.47 ampere for 25 milliseconds, mercury fulminate requiring 0.48 ampere for explosion under similar conditions. For this purpose they may be combined with known active oxidizing agents such as potassium or other metal chlorate, nitrates, chromates, permanganates and/or metal peroxides. If desired, additional ingredients such as lead thiocyanate, nitrostarch, nitrocellulose, metal sulfides or silicides may be utilized. The following are representative compositions: 10–40 parts by weight metal trinitrosophloroglucinate, 30–60 potassium chlorate, and 10–40 lead thiocyanate; and 85 metal trinitrosophloroglucinate with 15 parts by weight of nitrostarch. Likewise, metal trinitrosophloroglucinates may be advantageously utilized in the obtainment of improved initiating charges for blasting caps by admixture with substances such as mercury fulminate, lead azide, lead styphnate and diazodinitrophenol.

Having now described the invention, what is claimed as new and is desired to be secured by Letters Patent is:

1. A percussion- and heat-sensitive explosive composition comprising as an active ingredient a metal salt of trinitrosophloroglucinol.

2. A percussion- and heat-sensitive explosive composition comprising as an active ingredient a lead salt of trinitrosophloroglucinol.

3. A percussion- and heat-sensitive explosive composition comprising as an active ingredient a lead salt of trinitrosophloroglucinol containing about 56 to 60 percent lead.

4. An explosive composition comprising a metal salt of trinitrosophloroglucinol and an oxidizing agent.

5. An explosive composition comprising a metal salt of trinitrosophloroglucinol and an explosive aromatic nitro compound.

6. A primer composition comprising a metal salt of trinitrosophloroglucinol and a lead salt of a nitrophenolic compound.

7. A primer composition comprising a lead salt of trinitrosophloroglucinol and a lead salt of a nitrophenolic compound.

8. A primer composition comprising a lead salt of trinitrosophologlucinol and lead styphnate.

9. A primer composition comprising a lead salt of trinitrosophloroglucinol, lead styphnate, and an oxidizing agent.

WILLIAM B. WOODRING.